Dec. 6, 1960     H. O. SCHERENBERG     2,963,329
PISTON FOR AN INTERNAL COMBUSTION ENGINE
Filed July 23, 1958
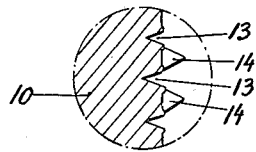
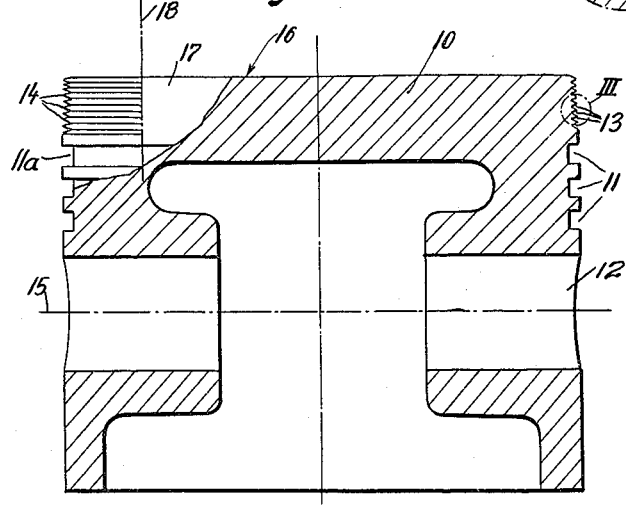
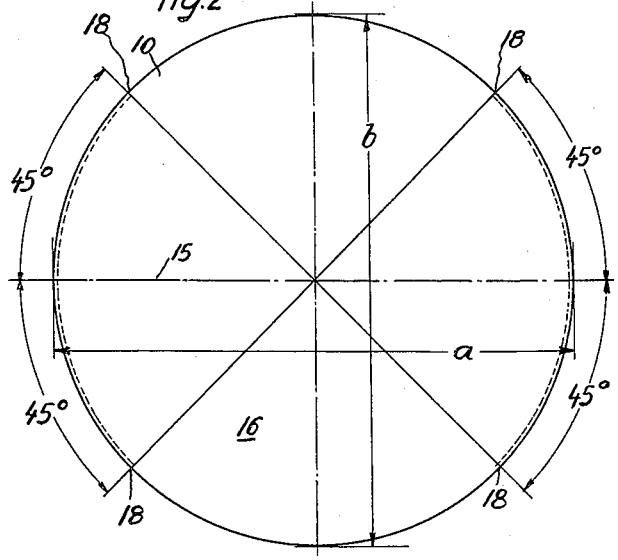
Inventor
HANS O. SCHERENBERG
BY Dicke and Craig
ATTORNEYS

United States Patent Office 2,963,329
Patented Dec. 6, 1960

2,963,329

PISTON FOR AN INTERNAL COMBUSTION ENGINE

Hans O. Scherenberg, Stuttgart-Heumaden, Germany, assignor to Daimler-Benz Aktiengesellschaft, Stuttgart-Unterturkheim, Germany Filed July 23, 1958, Ser. No. 750,526

Claims priority, application Germany July 26, 1957

6 Claims. (Cl. 309—10)

My invention relates to a piston for an internal combustion engine of the type provided with grooves for the accommodation of piston rings and with pliable ridges on its cylindrical surface in the neighbourhood of said grooves, said ridges having such a small radial height of, for instance, .004" that, upon assembly of the piston in the engine, they will be squeezed aside by the cylinder walls, thereby reducing the piston diameter automatically to such dimension as required to prevent seizure of the piston.

In prior pistons of this type the small ridges extend all around the circumference of the piston. As a result, the area of the piston surface bearing upon the cylinder walls with a substantial pressure was considerably reduced by such ridges. Such reduction, however, is undesirable.

Therefore, it is the primary object of my invention to provide an improved piston of the type indicated in which the pliable ridges extending on its cylindrical surface in peripheral direction will not materially reduce those areas of the cylindrical piston surface that exert bearing pressure upon the cylinder walls.

It is another object of my invention to provide an improved piston for an internal combustion engine which engages the cylinder walls with a minimized specific bearing pressure and yet is provided with groups of pliable parallel ridges disposed in areas of the cylindrical surface which do not materially contribute to the transfer of bearing pressure.

Further objects of my invention will appear from the detailed description of a preferred embodiment of my invention following hereinafter with reference to the accompanying drawing. I wish it to be clearly understood, however, that my invention is in no way restricted to such details but is capable of numerous modifications within the scope of the appended claims and that the terms and phrases used in such detailed description have been chosen for the purpose of explaining rather than restricting or limiting the invention.

In the drawing:

Fig. 1 is an elevation of the novel piston, partly in a diametrical section,

Fig. 2 is a plan view of the piston shown in Fig. 1, and

Fig. 3 shows the portion of Fig. 1 surrounded by a dashdotted circle on an enlarged scale.

The piston 10 for an internal combustion engine illustrated in Figs. 1 and 2 is provided with a transverse bore 12 for the accommodation of a piston pin, with an end face 16 spaced from the bore 12 and extending parallel to the axis 15 thereof and with a plurality of circumferential grooves 11 for the accommodation of piston rings, such grooves being disposed between the bore 12 and the end face 16.

Between the end face 16 and the circumferential groove 11a closest to the end face 16 the circumferential surface of the piston is provided with two circumferentially spaced groups of parallel pliable ridges 14 which in radial direction extend a distance of about .002" to .003" beyond the cylindrical surface 17 of the piston. One of such groups of ridges is shown in elevation in Fig. 1 at the upper left corner thereof, whereas the other group is shown in section in the upper right-hand corner thereof. The ridges of each group are spaced uniformly and are of equal arcuate length extending in planes parallel to the end face 16. Each group is disposed in axial registry with the bore 12. In this manner, the two groups of ridges are disposed in opposite areas. Each of these areas is confined between a pair of lines, such as line 18 in Fig. 3, extending lengthwise of the piston on the surface thereof on opposite sides of one end of the bore 12 at equal distances from the axis 15 thereof, such distances amounting to 45° in the embodiment shown, as will appear from Fig. 2.

As a result, opposite areas of the surface 17 which are spaced from the ends of the bore 12 are left free from ridges and these areas are confined between a pair of parallel lines 18 extending lengthwise of the piston on the surface thereof.

Preferably, the spaced parallel pliable ridges 14 confine grooves 13 between them that are formed in the cylindrical surface 17 so as to be co-extensive with the ridges 14. The width and depth of these grooves may be similar to the width and height of the ridges 14.

For the purpose of providing the piston 10 with the closely spaced parallel pliable ridges 14 and with the grooves 13 therebetween on the circumferential surface 17 I may proceed as follows: A suitable tool, such as a milling tool, is pressed upon the circumferential surface on each of a plurality of parallel circumferential circles. At the same time, a relative rotation is produced about the axis of the piston between the latter and the tool, thereby causing the tool to cut the grooves 13 along said circles. On either side of each group a burr will be formed by the tool. The pressure between the tool and the piston is so correlated to the distance between the circles or grooves that the burrs formed by the tool adjacent to the grooves will join to form the ridges 14.

When the piston so produced is assembled in the cylinder the tips of the ridges 14 will be squeezed aside and will closely hug the cylinder wall without exerting an undue pressure thereon causing seizure.

In operation of the engine the ridges 14 with the grooves 13 therebetween act as a labyrinth seal. In order to enhance the sealing effect, I prefer to give the piston or at least the portion thereof located between the end face 16 and the groove 11a a slightly oval cross-section with the largest diameter $a$ extending parallel to the axis 15 of the bore 12 and with the smallest diameter $b$ at right angles thereto.

With my novel piston a larger allowance is permissible for the diameter of the cylinder bores of the internal combustion engine, since the pliable ridges 14 will be squeezed aside and worn down, when the engine is broken in, to such extent that the resulting diameter of the piston will fit the cylinder bore even if the diameter of the latter should slightly differ from the prescribed dimension. Nevertheless, the wear of the piston is minimized by the fact that the ridges 14 are not provided on those areas of the piston which bear against the cylinder walls with a considerable pressure. Those areas are perfectly smooth whereby the specific pressure of contact with the cylinder wall is reduced to a minimum and whereby the formation of a continuous film of lubricant is ensured which will not be torn up by the ridges 14. The areas, however, that are in axial registry with the ends of the transverse bore 12 of the piston and accommodate the pliable ridges 14 are not subjected to considerable lateral forces. In this manner it is ensured that any cylinder bore will accommodate its mating piston with a perfect seal under conditions affording excellent heat transfer and a minimum of friction and wear.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Piston for an internal combustion engine provided with a transverse bore for the accommodation of a piston pin, formed with pliable ridges protruding outwardly from the cylindrical surface of said piston and extending in a circumferential direction over a part of the circumference of said piston, the remaining areas of said surface being free from said ridges, said ridges being disposed on opposite sides of the cylindrical surface of said piston within areas each of which is confined between a pair of lines extending lengthwise of the piston on the surface thereof on opposite sides of one end of said bore at substantially equal distances therefrom, each of said areas embracing an angle not substantially exceeding 90°.

2. Piston for an internal combustion engine provided with a transverse bore for the accommodation of a piston pin and provided with circumferentially extending pliable ridges on the cylindrical surface of said piston, opposite areas of said surface being free from said ridges, each of said areas being spaced from the ends of said bore and being confined between a pair of lines extending lengthwise of the piston on the surface thereof.

3. Piston for an internal combustion engine provided with a transverse bore for the accommodation of a piston pin, with an end face spaced from said bore and with a plurality of circumferential grooves for the accommodation of piston rings and arranged between said bore and said end face, said piston between said end face and said circumferential groove closest thereto having a slightly oval cross-section with the largest diameter extending parallel to said bore and having a circumferential surface provided with two circumferentially spaced groups of parallel pliable ridges extending in planes parallel to said end face, each group being disposed in axial registry with said bore.

4. A piston for an internal combustion engine including an end face, groove means for accommodating the piston rings therein and a transverse bore for accommodation of the piston pin, said piston being provided with pliable ridges on the surface located between said end face and said groove means, said ridges protruding outwardly and beyond the cylindrical surface of said piston and extending circumferentially on opposite sides of said piston a predetermined distance from the plane including the axis of said bore and the axis of said piston, the remaining areas of said surface being free from said ridges.

5. A piston according to claim 4, wherein the total circumferential extent of said ridges embraces an angle not substantially exceeding ninety degrees.

6. A piston according to claim 4, wherein said ridges are disposed in spaced parallel relationships confining grooves therebetween that are formed in said surface.

References Cited in the file of this patent

UNITED STATES PATENTS

| | | |
|---|---|---|
| 1,772,103 | Marien | Aug. 5, 1930 |
| 1,827,556 | Borgo et al. | Oct. 13, 1931 |
| 1,877,530 | Read | Sept. 13, 1932 |
| 1,964,480 | Phillips | June 26, 1934 |

FOREIGN PATENTS

| | | |
|---|---|---|
| 423,255 | Great Britain | Jan. 25, 1935 |